United States Patent [19]
Van De Ven

[11] Patent Number: 4,911,529
[45] Date of Patent: Mar. 27, 1990

[54] FRONT PROJECTION SCREEN

[75] Inventor: Johannes C. Van De Ven, Eindhoven, Netherlands

[73] Assignee: U.S. Philips Corporation, New York, N.Y.

[21] Appl. No.: 289,146

[22] Filed: Dec. 23, 1988

[30] Foreign Application Priority Data

May 27, 1988 [NL] Netherlands .......................... 8801361

[51] Int. Cl.$^4$ .............................................. G03B 21/60
[52] U.S. Cl. ...................................... 350/127; 350/129
[58] Field of Search ................................... 350/127–129

[56] References Cited

U.S. PATENT DOCUMENTS

| | | | |
|---|---|---|---|
| 4,152,047 | 5/1979 | Inoue .............................. | 350/129 X |
| 4,206,969 | 6/1980 | Cobb et al. ..................... | 350/129 X |
| 4,756,603 | 7/1988 | Ohtani ............................ | 350/129 X |
| 4,767,186 | 8/1988 | Bradley, Jr. et al. ............ | 350/128 |

FOREIGN PATENT DOCUMENTS 184939 10/1983 Japan ................................... 350/128

*Primary Examiner*—Richard A. Wintercorn
*Attorney, Agent, or Firm*—John C. Fox

[57] ABSTRACT

A front projection screen comprises a transparent plate, the front and rear sides of which have linear Fresnel structures crossing each other and whose rear side is reflective. The riser facets, termed edges, of at least the rear Fresnel lens structure, are substantially perpendicular to the plane of the plate. Ambient light incident on the screen leaves the screen on the rear side via the edges on the rear side or are absorbed by light absorbing material on the edges. This results in an enhancement of the contrast in the observed picture. Further measures enhancing the contrast are the provision of wedge-shaped indentations in the rear side of the plate.

10 Claims, 2 Drawing Sheets

FRONT PROJECTION SCREEN

BACKGROUND OF THE INVENTION

The invention relates to a front projection screen for visibly displaying an image in an audience space, which image is supplied by an image beam from a primary image source, said screen comprising a plate having a front side facing the audience space and the image source, said plate having a Fresnel structure for converging the image beam in the audience space and having means for spreading light of the image beam in the audience space.

A front projection screen of this type is known from FR-A No. 2,413,685. The front side of the front projection screen described in this Patent Application has a Fresnel structure and an anisotropic layer in which the incident light is reflected and spread in a diffuse manner. The function of the Fresnel structure is to converge the image beam from the image source to the viewers in the audience space. The image observed in the audience space therefore has a comparable brightness throughout the screen. The anisotropic layer spreads the light so that the projected image is visible in the whole audience space. This is accomplished by providing the layer proximate to the front side of the screen so that the spreading of light in one direction is larger than in the transverse direction.

A problem with images projected on projection screens is that the contrast of the observed image is reduced due to ambient light incident on the screen and subsequently being reflected towards the audience. In the case of a diffusely reflecting projection screen, such as the known screen, substantially all the incident ambient light is reflected. In addition, the anisotropic reflecting layer in the known screen requires special materials and manufacturing techniques to obtain the anisotropy, with the same extent of diffusion in the entire plate.

OBJECTS AND SUMMARY OF THE INVENTION

It is an object of the invention to provide a front projection screen in which a portion of the incident ambient light is not reflected and whose optically active parts of the screen have an isotropic composition. To this end the projection screen according to the invention is characterized in that the plate is transparent and in that a rear side of the plate remote from the audience space is provided with reflecting means and with a relief structure comprising faces which are substantially perpendicular to the plane of the plate.

The relief structure on the rear side of the plate comprises for example reflecting Fresnel facets with edges or riser facets therebetween, the edges arranged substantially perpendicularly to the plane of the plate. Light which is incident through the plate on the edges will partly emerge via these edges on the rear side of the plate. Consequently, this light cannot emerge on the front side towards the audience space. Light which is first reflected on the Fresnel facets will partly emerge from the rear side of the screen via the edges. Due to the orientation of the screen with respect to the image source and the sources of the ambient light, relatively more ambient light will be incident on the edges than will light from the image beam. This results in a reduction of the deterioration of the contrast in the observed image due to reflected ambient light than in the known screen. The screen material itself is a homogeneous material so that problems caused by the addition of anisotropic layer are obviated.

Preferably, a front projection screen according to the invention has a first linear Fresnel structure extending on the front side of the plate in a first direction and has a second linear Fresnel structure which extends on the rear side in a second direction substantially perpendicularly to the first direction. a linear Fresnel structure can be made in a relatively simple way. The first Fresnel structure on the front side of the plate may be, for example, a horizontal Fresnel structure converging the image beam in the vertical direction. The second Fresnel structure is then a structure extending in the vertical direction and converging the image beam in the horizontal direction towards the audience space.

It is to be noted that it is known per se, for example, from U.S. Pat. No. 3,580,661 to provide two linear Fresnel structures on either side of a transparent plate in a projection screen. However, the known screen is a rear projection screen, that is to say, a screen intended for a projection device in which the image beam, viewed from the audience space, is incident on the rear side. In such a screen there is no problem of incident light from the image beam and ambient light being incident on the same side of the screen, where only the first-mentioned light must be reflected as much as possible.

Light spreading means comprising a microlens structure provided on the rear side of the plate, which microlens structure maybe comprises a multitude of cylindrical lenses arranged on facets of the second Fresnel structure and extending in the second direction, parallel to the facets, for spreading light of the image beam in the audience space in a direction perpendicular to the second direction. The microlens structure on the rear side of the transparent plate can be formed simultaneously and with the aid of the same means as is used to form the Fresnel structure. As compared with light spread in a random manner, light spreading my means of a microlens structure has the advantage that the reflected light can be better concentrated within the audience space.

Light spreading means comprising a bulk diffusor incorporated in the transparent plate may also be employed. A bulk diffusor consists of transparent particles homogeneously incorporated in the plate and having a refractive index which differs from the refractive index of the plate material. The bulk diffusor spreads the light through the plate uniformly in all directions and thus also causes light spreading in the direction in which the microlenses extend on the rear side of the plate.

The bulk diffusor is preferably provided as a thin layer in the transparent plate. This has the advantage of a higher resolution for an image displayed on the screen, as compared with a screen in which the bulk diffusor is spread throughout the thickness of the plate.

Light spreading means comprising microlens structure may also be provided on the front side of the plate, which microlens structure comprises a multitude of cylindrical lenses arranged on facets of the first Fresnel structure and extending in the first direction, parallel to the facets, for spreading light of the image beam in the audience space in a direction perpendicular to the first direction. The quantity of bulk diffusor in the plate may be reduced or even entirely omitted due to this lens structure arranged on the front side. Less bulk diffusor in the plate and/or providing the bulk diffusor as a thin layer in the plate contributes to the sharpness of the observed image. In this embodiment the bulk diffusor which is still present is used to mitigate too abrupt intensity variations, for example, due to inaccuracies in the structures on the front and rear sides of the plate, so that an intensity distribution which is pleasant to the eye is created.

In a preferred embodiment of the front projection screen according to the invention, the transparent plate has indentations on its rear side. The indentations may extend throughout the width or height of the plate or only through a part thereof. Radiation incident on the edges of the indentations is reflected thereon or partly emerges to the exterior, dependent on the angle of incidence. Since the indentations are positioned in such a way that the edges extend at a small angle to the image beam from the image source, light from the image beam will be substantially only reflected and a considerable part of the ambient light, incident under a larger angle, will leave the plate on its rear side via the edges. Thus, relatively less ambient light is reflected than light of the image beam so that the contrast in the projected image is higher.

The indentation preferably comprise light-absorbing material. Consequently, the light emerging to the exterior via the edges of the indentations is absorbed and can no longer reach the audience space via other paths, for example, after reflection on other faces.

The riser facets in the Fresnel structure on the front and/or rear side of the transparent plate may also comprise a light-absorbing material to predominantly absorb light from directions other than the direction from which the image beam comes, thus resulting in a higher contrast in the projected image. It is to be noted that within the scope of the invention "an image source" is not only a single image source, for example, a conventional slide or film projector, but also an image source comprising a plurality of projectors placed proximate to one another, such as a projection system which is used to display a colour television or video program, which projection system has separate projectors for the three primary colours.

BRIEF DESCRIPTION OF THE DRAWINGS

The invention will now be described in greater detail, by way of example, with reference to the accompanying drawings in which.

DESCRIPTION OF THE PREFERRED EMBODIMENTS

Figure 1:
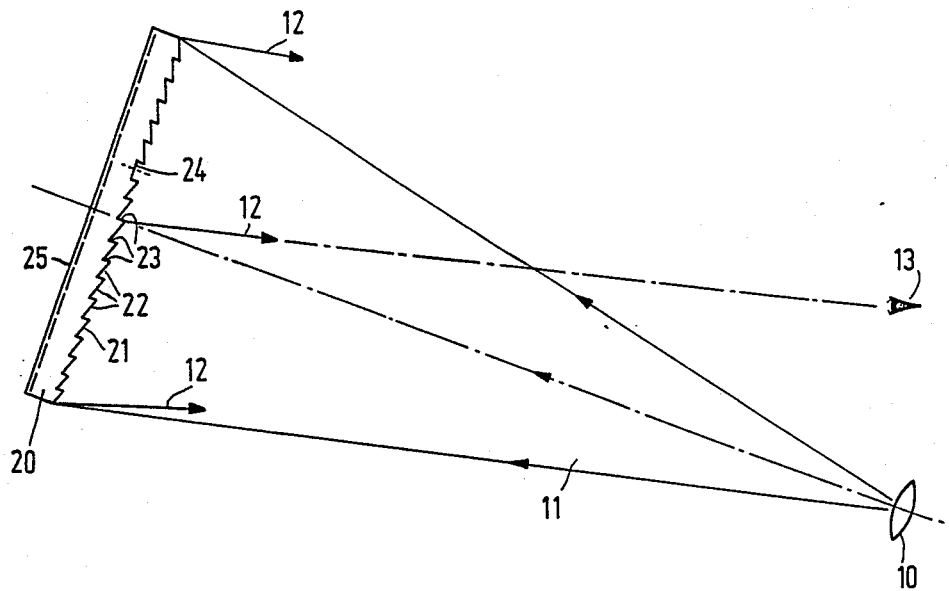
FIG. 1 is a cross-sectional side view of a front projection screen according to the invention, arranged in a position with respect to the image source and the audience space.

FIG. 1 is a vertical cross-section of the front projection screen 20 according to the invention. A primary image source, of which only a projection lens 10 is shown, supplies an image beam 11. The image source may be, for example, a conventional slide or film projector but it may also be three separate projectors, one for each of the primary colours red, green and blue, suitable for projecting a television or video program.

Another example of a suitable projector is a projector in which a light beam is modulated by means of liquid crystal modulators in accordance with a video or television program to be displayed.

The image beam 11 is reflected by the projection screen 20 in the direction of a viewer 13 who is present in the audience space. The reflected beam is denoted by the arrows 12.

The screen is preferably tilted forward, the upper edge being closer to the audience space than the lower edge. This position corrects the keystone distortion which occurs when the chief ray of the image beam is not perpendicularly incident on the screen, but from below. Such an arrangement has the further advantage that ambient light incident from above on the screen is reflected mainly downwards instead of towards the audience space. Most sources of ambient light are generally present at a level which is higher than that of the screen and/or the audience space.

The front projection screen comprises a plate of transparent material having a front side 21 and a rear side 25. The front side 21 has a Fresnel structure comprising a plurality of reflecting facets 22 ("facets") with intermediate riser facets edges 23 or ("edges"). The facets and edges extend in the horizontal direction, perpendicularly to the plane of the drawing. The edges are arranged substantially perpendicularly to the plane of the transparent plate 20. The facets 22 extend at an acute angle to the plane of the plate. This angle increases from a center 24 to the edge of the plate. The center 24 of the Fresnel structure is above the center of the plate 20. This provides a correction for the fact that the audience space is above the image source.

Figure 2:
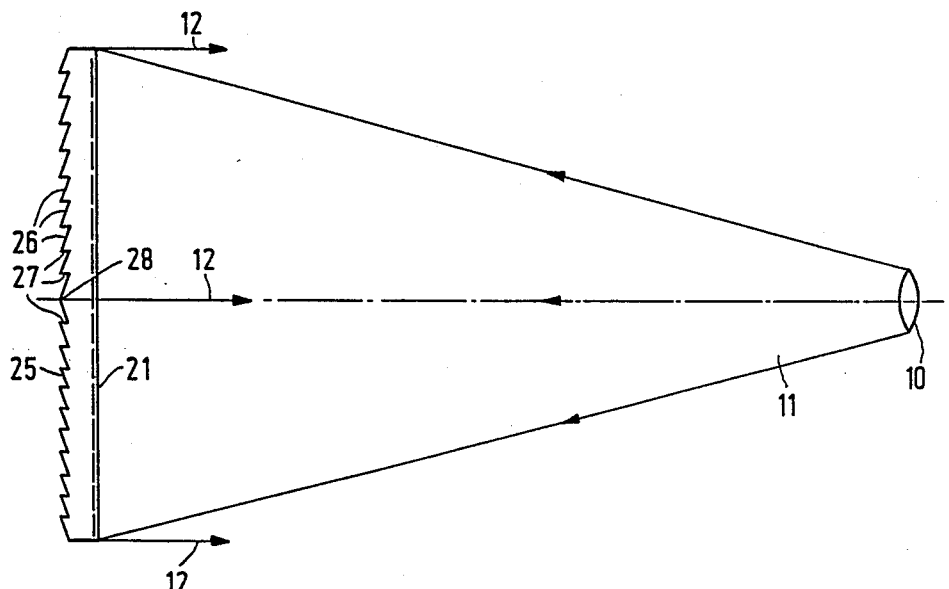
FIG. 2 is a sectional plan view of the projection screen of FIG. 1, and FIGS. 3 and 4 are detailed cross-sectional side views of two other embodiments of a projection screen according to the invention.

FIG. 2 is a horizontal cross section showing a plan view of the front projection screen of FIG. 1. Like the front side, the rear side has a linear Fresnel structure extending in the vertical direction, perpendicularly to the plane of the drawing. This Fresnel structure comprises facets 26 and edges 27. The edges 27 are approximately perpendicular to the plane of the plate 20. The facets 26 extend at an outwardly increasing angle to this plane. In the embodiment shown the center 28 of the Fresnel structure is in the center of the screen.

Figure 3:
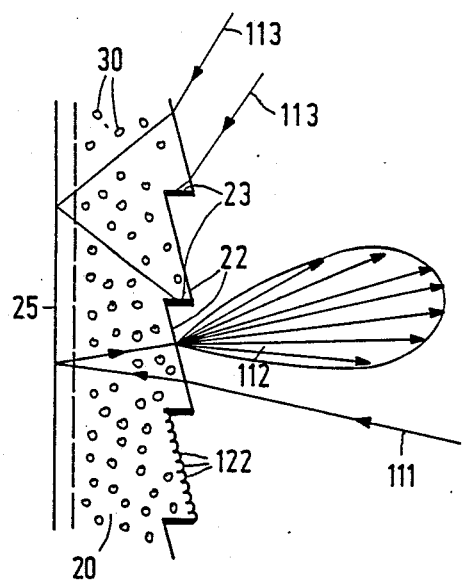

FIG. 3 is a detail, shown, in a side view, of a vertical cross-section of another embodiment of the projection screen according to the invention. A light ray 111 from the image source 10 (not shown) is incident on one of the facets 22 on the front side of the plate 20. The light ray subsequently traverses the plate, is reflected on the mirror coating provided on the rear side 25 and, after transmission via one of the facets 22, it emerges on the front side. A bulk diffusor comprising transparent material grains 30 having a refractive index which is different from that of the material of the plate 20 is provided in the plate 20. Due to this bulk diffusor the light ray 111 does not emerge as a narrow light ray but as a spread beam of light denoted by 112 in the Figure. The average direction of the beam 112 in the plane of the drawing is determined by the angle of incidence of the light ray 111 and the angle between the facets 22 and the plane of the plate 20. The extent of light spreading is determined by the quantity of bulk diffusor.

In addition to bulk diffusion, spreading of light may be caused by unevennesses on the surfaces of the facets 22 or on the rear side such as by microlenses 122. For light spreading in the vertical direction, the plane of the drawing in FIG. 3, these may be cylindrical lenses extending in the horizontal direction, perpendicularly to the plane of the drawing. These lenses may be formed simultaneously with the facets 22 on the plate 20. The use of cylindrical lenses for light as compared with the use of bulk diffusor has the advantage the angular distribution of the light spreading is much better controlled and that spreading outside the audience space can be suppressed. A small quantity of bulk diffusor is, however, desired to mitigate the effects of inaccuracies in the surface. The microlens structure may comprise convex cylindrical lenses, with their convex shape facing the audience space, or concave cylindrical lenses with their hollow side facing forwards, or it may comprise concave lenses alternating with convex lenses.

To enhance the contrast in the projected image observed by the viewers, the edges 23 of the Fresnel structure are preferably provided with a light-absorbing, for example, matt black layer. Ambient light incident on the screen, denoted by light rays 113, is partly intercepted on the edges by the absorbing layer. Since the light from the image source is incident on the screen in a direction which is more parallel to the edges 23 than the ambient light coming from other directions, relatively more ambient light is intercepted than light from the image beam, so that the net effect is an enhancement of the contrast.

Figure 4:
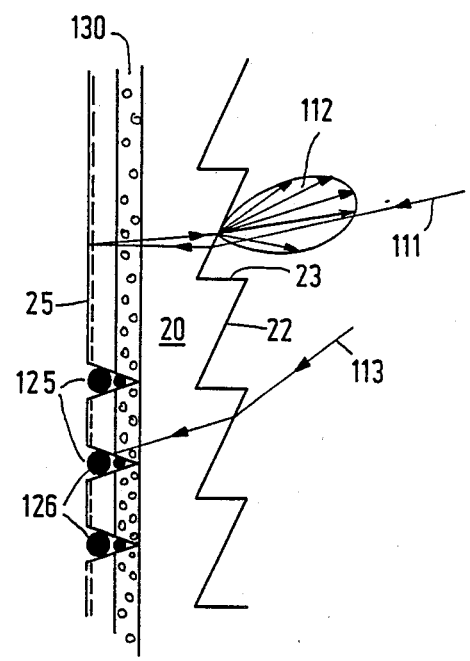

FIG. 4 shows an embodiment having a further means to enhance the contrast. The rear side 25 of the transparent plate 20 has wedge-shaped indentations 125. These indentations extend entirely or partly throughout the width of the plate. The light from the image beam incident on the edges of these indentations is substantially entirely reflected on the edges. However, ambient light 113 is predominantly incident at an angle at which it emerges to the exterior on the rear side of the screen. Light-absorbing material 126 may be provided in the indentations 125 so as to absorb this light emerging.

In the embodiment of the screen shown in FIG. 4, the bulk diffusor is provided in a thin layer 130 in the transparent plate 20. Due to this measure the sharpness of the image projected on the screen is enhanced.

Figure 5:
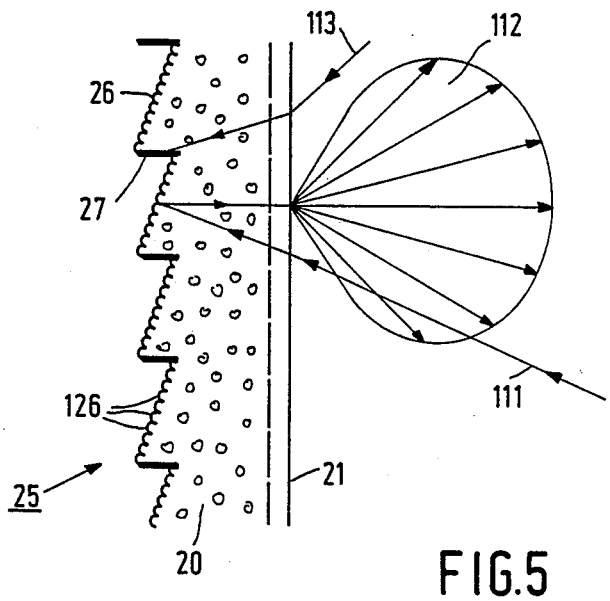
FIG. 5 is a cross-sectional view showing a part of FIG. 2 in greater detail.

FIG. 5 is a detail of FIG. 2 showing further enhancements of the front projection screen according to the invention. The Fresnel facets 26 on the rear side of the plate 20 have a microlens structure 126 extending in the vertical direction, transversely to the plane of the drawing. The microlens structure causes a spreading of the incident light in the horizontal plane, the plane of the drawing. The rear side of the facets is further provided with a layer reflecting light to the front side.

A light ray 111 from the image source traverses the plate 20, is reflected on the rear side and leaves the plate as a beam 112 spread in the horizontal plane. The bulk diffusor incorporated in the plate also contributes to the spreading of light in the horizontal direction.

The edges 27 of the Fresnel structure are provided with a light-absorbing, for example, matt black layer. The light incident on these edges therefore is absorbed. As a result of the orientation of the edges with respect to the incident image beam and the ambient light, the fraction of the ambient light incident on the edges will be considerably larger than the fraction of the image beam reaching the edges. The contrast in the image observed is thus higher because relatively more ambient light is intercepted than light from the image source.

I claim:

1. A front projection screen for visibly displaying an image in an audience space, which image is supplied by an image beam from a primary image source, said screen comprising a plate having a front side facing the audience space and the image source, said plate having a Fresnel structure for converging the image beam in the audience space and having means for spreading light of the image beam in the audience space, the plate being transparent and a rear side of the plate remote from the audience space being provided with reflecting means and with a relief structure comprising faces which are substantially perpendicular to the plane of the plate characterized in that the faces comprise light absorbing material.

2. A front projection screen as claimed in claim 1 in which the Fresnel structure comprises a first linear Fresnel structure having facets and edges extending on the front side of the plate in a first direction, and a second linear Fresnel structure having facets and edges which extend in a second direction substantially perpendicularly to the first direction on the rear side, the edges being substantially perpendicular to the plane of the plate.

3. A front projection screen as claimed in claim 2, in which the light spreading means comprises a microlens structure provided on the rear side of the plate, which microlens structure comprises a multitude of cylindrical lenses arranged on the facets of the second Fresnel structure and extending in the second direction, parallel to the facets, for spreading light of the image beam in the audience space in a direction perpendicular to the second direction.

4. A front projection screen as claimed in claim 2 in which the light spreading means comprises a bulk diffusor incorporated in the transparent plate 5. A front projection screen as claimed in claim 4, characterized in that the bulk diffusor is provided as a thin layer in the transparent plate.

6. A front projection screen as claimed in claim 2 in which the light spreading means comprises a microlens structure provided on the front side of the plate, which microlens structure comprises a multitude of cylindrical lenses arranged on facets of the first Fresnel structure and extending in the first direction, parallel to the facets, for spreading light of the image beam in the audience space in a direction perpendicular to the first direction.

7. A front projection screen as claimed in claim 1 in which the transparent plate has indentations on its rear side.

8. A front projection screen as claimed in claim 7, in which the indentations comprise light-absorbing material.

9. A front projection screen as claimed in claim 2, in which the edges in the first Fresnel structure on the front side of the transparent plate comprise light-absorbing material.

10. A front projection screen as claimed in claim 2, 6, 7 or 8, characterized in that riser facets in the second Fresnel structure on the rear side of the transparent plate comprise light-absorbing material.

* * * * *